3,642,692
ROOM TEMPERATURE VULCANIZABLE SILICONE RUBBER WITH IMPROVED CLEANABILITY
James V. Hartlage, Midland, Mich., assignor to Dow Corning Corporation, Midland, Mich.
No Drawing. Filed Apr. 9, 1970, Ser. No. 27,169
Int. Cl. C08f 11/04
U.S. Cl. 260—46.5 G    4 Claims

ABSTRACT OF THE DISCLOSURE

A mixture of a polydiorganosiloxane having hydroxyl, acetoxy or alkoxy terminating groups, an organotriacetoxysilane and tetraethoxysilane or ethylpolysilicate cure to a silicone rubber at room temperature which is easier to clean than similar compositions without the tetraethoxysilane or ethylpolysilicate. This silicone rubber is useful as caulking compounds, sealants, encapsulants and electrical insulation.

---

This invention relates to a room temperature vulcanizable silicone rubber.

Silicone rubbers which vulcanize at room temperature, for the most part, suffer the disadvantage that they pick up dirt and are not easily cleaned once they have become dirty. A building using the silicone rubber in sealing joints becomes unattractive when the sealant becomes dirty and cannot be cleaned properly to regain its aesthetic value. It is, therefore, advantageous to have a silicone rubber which can be readily cleaned. It is, therefore, an object of the present invention to provide one class of room temperature vulcanizatble silicone rubbers which have improved cleanability.

This invention relates to a composition which is stable in the absence of moisture but cures to a silicone rubber when exposed to moisture at room temperature consisting essentially of (A) 100 parts by weight of a polydiorganosiloxane having a unit formula $R_2SiO$ bonded together by silicon-oxygen-silicon bonds and having a viscosity of from 1,000 to 50,000 cs. at 25° C., said polydiorganosiloxane being terminated by radicals selected from the group consisting of hydroxyl radicals and radicals of the formula $R(YO)_2SiO_{0.5}$ where R is a monovalent radical selected from the group consisting of methyl, ethyl, vinyl and phenyl, at least 75 percent of the R groups being methyl radicals and YO— is acetoxy or alkoxy having from 1 to 4 inclusive carbon atoms per alkoxy radical, (B) from 0.5 to 15 parts by weight of $$R'Si(OOCCH_3)_3$$

where R' is a monovalent radical selected from the group consisting of methyl, ethyl, vinyl, n-propyl, isopropyl, n-butyl, isobutyl, amyl and phenyl, and (C) from 0.5 to 5 inclusive parts by weight of an ethoxylated compound selected from the group consisting of tetraethoxysilane and ethylpolysilicate wherein the amount of ethoxy is from 50 to 75 inclusive weight percent based on the weight of the ethylpolysilicate.

The polydiorganosiloxane of (A) has a unit formula $R_2SiO$ wherein the units are bonded together with silicon-oxygen-silicon bonds. Each R group can be methyl, ethyl, vinyl or phenyl and the $R_2SiO$ can be illustrated by dimethylsiloxane units, diethylsiloxane units, diphenyl-siloxane units, phenylmethylsiloxane units, ethylmethyl-siloxane units, methylvinylsiloxane units and the like. The R groups in the polydiorganosiloxane are at least 75 percent methyl radicals and preferably all methyl radicals. The polydiorganosiloxanes can be terminated by hydroxyl radicals to provide hydroxyl endblocked polydiorganosiloxanes or by $R(YO)_2SiO_{0.5}$ units where R is defined above and YO— is acetoxy or alkoxy of 1 to 4 carbon atoms to provide either alkoxy endblocked polydiorganosiloxanes or acetoxy endblocked polydiorganosiloxanes. The viscosity of the polydiorganosiloxanes can be from 1,000 to 50,000 cs. at 25° C., preferably from 1,500 to 30,000 cs. at 25° C. The alkoxy radical can be illustrated by methoxy, ethoxy, propoxy and butoxy. The polydiorganosiloxanes are well known in the art as illustrated by Bruner in U.S. Pat. No. 3,035,016 which describes polydiorganosiloxanes terminated by monoorganodiacetoxysiloxy units, which is hereby incorporated by reference in teaching the polymers and the method of preparation comprising heating the appropriate mixture of hydroxyl endblocked polydiorganosiloxane and organotriacetoxysilane. Bruner in U.S. Pat. No. 3,077,465 further describes room temperature vulcanizable organopolysiloxane elastomers prepared from the polymers of U.S. Pat. No. 3,035,016. U.S. Pat. No. 3,077,465 describes the use of curing catalyst such as metal salts of carboxylic acid such as dibutyltin diacetate, dibutyltin dilaurate, as well as other salts of lead, tin, nickel, cobalt, iron, cadmium, chromium, zinc and manganese. U.S. Pat. No. 3,077,465 is hereby incorporated by reference in describing the room temperature vulcanizable organopolysiloxane elastomers in the use of a catalyst, fillers, flame retardants, stabilizing agents, plasticizers and the like. Russell in U.S. Pat. No. 3,061,575 further describes both the acetoxy and hydroxyl endblocked polydiorganosiloxanes and a method of curing by using magnesium oxide. U.S. Pat. No. 3,061,575 is hereby incorporated by reference. Ceyzeriat in U.S. Pat. No. 3,133,891 describes compositions comprising a hydroxyl endblocked polydiorganosiloxane and an organotriacetoxysilane which cures to a silicone rubber at room temperature. U.S. Pat. No. 3,133,891 is hereby incorporated by reference in further illustrating the hydroxyl endblocked polydiorganosiloxanes, the organotriacetoxysilanes, as well as the use of fillers, catalysts and other additives. Dupree in U.S. Pat. No. 3,274,145 describes a hydroxyl endblocked polydiorganosiloxane and an organotriacetoxysilane which cures to a silicone rubber. Dupree shows that some of the hydroxyl radicals can be replaced by triorganosiloxy units. U.S. Pat. No. 3,274,145 is hereby incorporated by reference for the description of the partial triorganosiloxy endblocking. Other references include U.S. Pat. No. 3,240,731 issued to Nitzsche et al., U.S. Pat. No. 3,382,205 issued to Beers and U.S. Pat. No. 3,474,064 issued to Hittmair et al.

Brown et al. in U.S. Pat. No. 3,161,614 describes alkoxy endblocked polydiorganosiloxanes suitable for use in the present invention. U.S. Pat. No. 3,161,614 is hereby incorporated by reference for the description of the alkoxy endblocked polydiorganosiloxanes.

Component (B) of the composition of this invention is an organotriacetoxysilane of the formula $R'Si(OOCCH_3)_3$ where R' is methyl, ethyl, vinyl, n-propyl, isopropyl, n-butyl, isobutyl, amyl or phenyl. The amount of the organotriacetoxysilane can range from 0.5 to 15 parts by weight based on 100 parts by weight of (A). For best results the lower amounts of (B), such as 0.5 to 5 parts by weight are used when (A) is acetoxy endblocked and the higher amounts such as from 5 to 15 parts by weight are used when (A) is hydroxyl endblocked. However, suitable products can be prepared from other combinations of (A) and (B). The organotriacetoxysilanes are further described in the patents cited herein.

Component (C) is either tetraethoxysilane, ethylpolysilicate or a mixture thereof. Tetraethoxysilane and ethylpolysilicate are well known and can be purchased commercially. For the purposes of the present invention, the ethylpolysilicate can have from 50 to 75 inclusive weight percent ethoxy based on the weight of the ethylpolysilicate, preferably from 60 to 75 weight percent ethoxy. The amount of component (C) can be from 0.5 to 5 inclusive parts by weight based on 100 parts by weight of (A).

The composition of this invention can also contain fillers, such as reinforcing silicas, titanium dioxide, diatomaceous earth, iron oxide and the like, the reinforcing silica fillers are preferably used in amounts from 1 to 35 parts by weight based on 100 parts by weight of (A), however, both the reinforcing silica fillers and the other fillers can be used in widely varying amounts. Other additives conventionally used in the room temperature vulcanizable silicone rubber can also be used.

Preferably, the composition of the present invention contains a curing catalyst, such as the metal salts of carboxylic acids described above. These catalysts are used in amounts from 0.01 to 10 parts by weight based on 100 parts of (A).

The compositions of the present invention when cured have a surface which is more easily cleaned than similar compositions without the tetraethoxysilane or ethylpolysilicate. The compositions of the present invention are useful in the conventional manner as other room temperature vulcanizable silicone rubber, such as coatings, sealants, encapsulants and electrical insulation. The compositions are particularly useful as coatings and sealants where the coating or sealant comes in contact with a dirty atmosphere, since they are more easily cleaned.

The following examples are illustrative only and should not be construed as limiting the present invention which is properly delineated in the claims. All parts are by weight unless otherwise stated.

EXAMPLE 1

Five mixtures were prepared in the absence of moisture varying the amount of ethylpolysilicate which had about 72.5 weight percent ethoxy. The formulation was 140 parts of a hydroxyl endblocked polydimethyl-siloxane having a viscosity of 16,000 cs. at 25° C., and the terminal radicals are 95 percent hydroxyl and 5 percent trimethylsiloxy units,
14 parts of a reinforcing silica filled,
6 parts of titanium dioxide,
4 parts of a hydroxyl endblocked phenylmethylsiloxane fluid,
8.95 parts of a mixture of 50 weight percent methyltriacetoxysilane and 50 weight percent ethyltriacetoxysilane,
0.05 part of dibutyltin diacetate, and
X parts of ethylpolysilicate.

The following table shows the test results for the physical properties obtained by ASTM methods, tensile and elongation at break, ASTM–D–412, Die "B" tear strength, ASTM–D–624–54.

The cleanability was determined by molding a 2 inch by 4 inch by .125 inch test piece of the compositions by exposure to ambient air for 7 days. Carbon black was then spread over one surface of the test piece and then rubbed with a cloth until the surface was completely covered. The carbon black surface was then covered with a thin layer of a powdered cleanser and thereafter rubbed 20 times with moderate pressure using a slightly wet sponge. The cleanser and carbon black were then washed off by placing the test piece under a stream of water from a faucet. The washed test piece surface was then compared with a set of standards to determine the cleanability rating. The cleanability ratings range from 1 to 9 with 9 being the dirtiest.

| Parts of X | Durometer, Shore A | Tensile, p.s.i. | Elongation, percent | Die B, tear strength, p.p.i. | Cleanability |
|---|---|---|---|---|---|
| 0.0 | 29 | 220 | 360 | 24 | 5 |
| 0.5 | 26 | 240 | 370 | 25 | 3–4 |
| 1.0 | 28 | 240 | 380 | 24 | 2–3 |
| 2.0 | 27 | 270 | 480 | 25 | 1–2 |
| 3.0 | 28 | 240 | 370 | 25 | 1 |

EXAMPLE 2

Equivalent results are obtained when tetraethoxysilane and ethylpolysilicates having 50%, 60%, 65%, 70% and 75% ethoxy by weight replace the ethylpolysilicate of Example 1.

That which is claimed is:

1. A composition which is stable in the absence of moisture but cures to a silicone rubber when exposed to moisture at room temperature consisting essentially of
   (A) 100 parts by weight of a polydiorganosiloxane having a unit formula $R_2SiO$ bonded together by silicon-oxygen-silicon bonds and having a viscosity of from 1,000 to 50,000 cs. at 25° C., said polydiorganosiloxane being terminated by radicals selected from the group consisting of hydroxyl radicals and radicals of the formula $R(YO)_2SiO_{0.5}$ where R is a monovalent radical selected from the group consisting of methyl, ethyl, vinyl and phenyl, at least 75 percent of the R groups being methyl radicals and YO— is acetoxy or alkoxy having from 1 to 4 inclusive carbon atoms per alkoxy radical,
   (B) from 0.5 to 15 parts by weight of $R'Si(OOCCH_3)_3$ where R' is a monovalent radical selected from the group consisting of methyl, ethyl, vinyl, n-propyl, isopropyl, n-butyl, isobutyl, amyl and phenyl, and
   (C) from 0.5 to 5 inclusive parts by weight of an ethoxylated compound selected from the group consisting of tetraethoxysilane and ethylpolysilicate wherein the amount of ethoxy is from 50 to 75 inclusive weight percent based on the weight of the ethylpolysilicate.

2. The composition in accordance with claim 1 wherein a filler and a metal salt of carboxylic acid are also present.

3. The composition in accordance with claim 1 wherein the polydiorganosiloxane of (A) has a viscosity of from 1,500 to 30,000 cs. at 25° C., and the ethoxylated compounds is ethylpolysilicate having from 60 to 75 weight percent ethoxy.

4. The composition in accordance with claim 2 wherein the ethoxylated compound is ethylpolysilicate having from 60 to 75 weight percent ethoxy.

References Cited

UNITED STATES PATENTS 3,440,207   4/1969   Nitzsche et al. _____ 260—37

DONALD E. CZAJA, Primary Examiner

M. I. MARQUIS, Assistant Examiner

U.S. Cl. X.R.

252—63.7 R; 260—18 S, 37 SB, 825 R